Patented Dec. 9, 1952

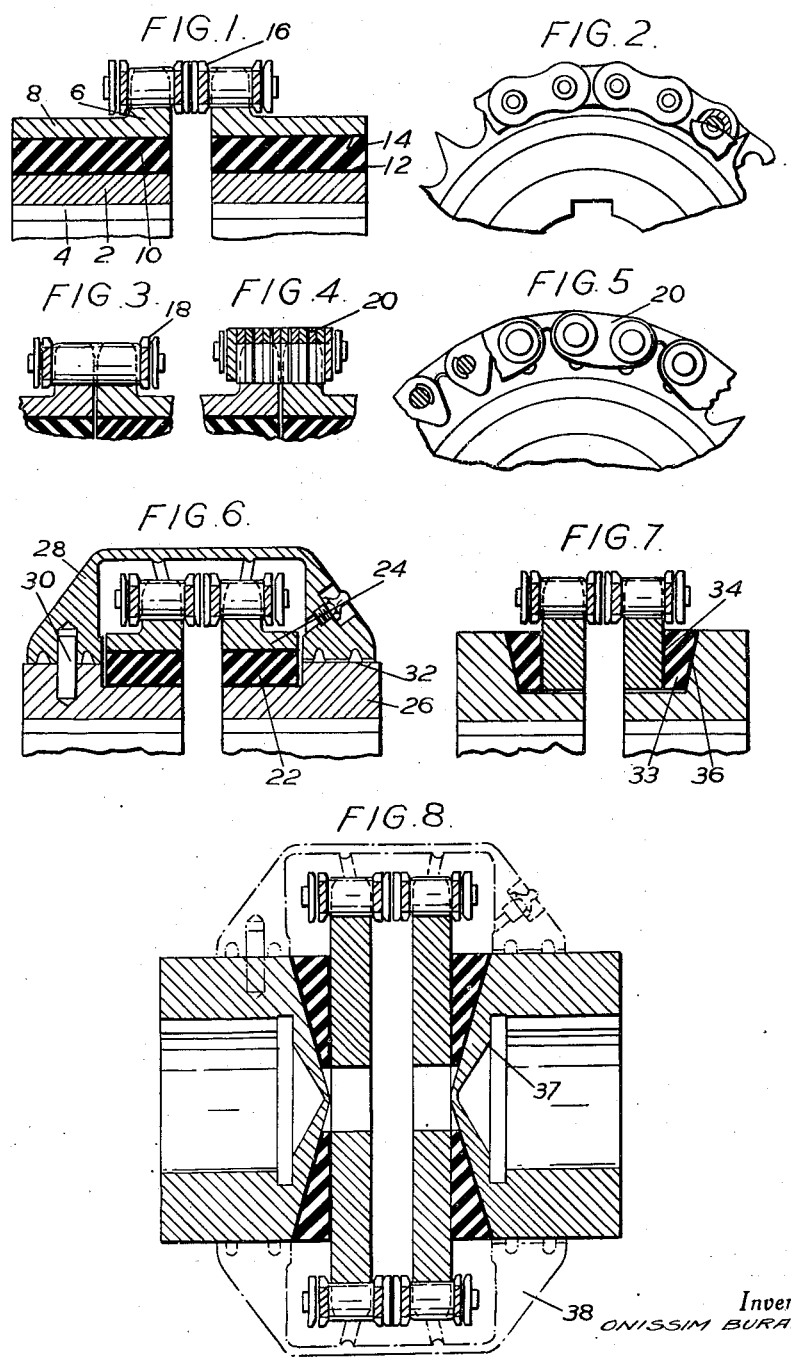

2,620,639

UNITED STATES PATENT OFFICE 2,620,639

FLEXIBLE CHAIN COUPLING

Onissim Burawoy, Didsbury, Manchester, England

Application December 8, 1950, Serial No. 199,836 In Great Britain December 23, 1949

7 Claims. (Cl. 64—11)

Chain couplings are a convenient form of detachable connection between coaxial shafts, such as the shafts of a motor and machinery driven by it. These couplings consist of similar sprockets face to face, one on the end of each shaft, and a detachable chain surrounding and engaging both sprockets. Chains of various kinds may be used, e. g. single or double roller chains or inverted tooth chains. The flexibility of these couplings is small since the chain fits fairly closely around the two sprockets and itself is practically inextensible longitudinally. Accordingly the couplings can only be fitted to well-aligned shafts and they tend to transmit any large irregularity of running from one shaft to the other.

It is an object of the present invention to provide a chain coupling in which irregularities of running in the two shafts are absorbed in one or more parts of a flexible material such as rubber.

It is a further object to provide a coupling in which the rim of one or both the sprockets is joined to its hub by a flexible connection in the form of one or more parts of natural or synthetic rubber or other resiliently distortible material having physical characteristics similar to those of rubber.

In carrying out the invention the flexible connection in each sprocket is preferably in the form of a single ring of rubber interposed between the rim and hub. The flexible connection may, however, take the form of a number of parts arranged, for example, as thick spokes. The flexible parts may be mechanically connected to the hub and rim, for example by interengagement of small studs or by compression of the rubber to set up great friction. Preferably, however, they are bonded to surfaces on the hub and rim.

The accompanying drawings show various examples of chain couplings embodying the invention.

In these drawings:

Figure 1 is a radial section and

Figure 2 an end elevation of part of one coupling;

Figures 3 and 4 are sections of the same coupling showing the use of alternative chains;

Figure 5 is an end elevation corresponding to Figure 4; and

Figures 6, 7 and 8 are radial sections of other couplings.

In all the couplings shown both sprockets are identical and the flexible connection is in the form of a rubber ring bonded to the hub and rim.

In Figures 1 and 2 the hub 2 of each sprocket is a plain cylinder with a keyway 4 for securing to a shaft. The rim 6 has an axial flange 8 of equal length to the hub 2 and a rubber ring 10 is bonded to cylindrical surfaces 12 and 14 on the hub and rim. The coupling is completed by a double roller chain 16. Figure 3 illustrates the alternative use of a single roller chain 18 with pins of sufficient length to embrace the teeth of both sprockets, and Figures 4 and 5 show the alternative use of an inverted tooth chain 20. The teeth of the sprockets in Figures 4 and 5 are of course shaped to suit the inverted tooth chain.

In the coupling shown in Figure 6 the rubber rings 22 are considerably shorter axially than the rings 10 and the flanges 24 on the rims are correspondingly shorter. The hubs 26 are, however, maintained at the same length and the coupling is fitted with a cover 28 secured by a dowel 30 to one hub and making a running fit at 32 on the other.

In the coupling shown in Figure 7 the rubber ring 33 is bonded not to cylindrical surfaces but to a plane surface 34 on the rim and a surface 36 which is part of an obtuse cone on the hub.

In the coupling shown in Figure 8 the rubber ring 37 is of greater radial extent than in Figure 7 to give a greater area of bond. A cover 38 is indicated in dotted outline.

I claim:

1. A chain coupling comprising two coaxial sprockets and a single chain surrounding and engaging both said sprockets, wherein at least one of said sprockets is formed of a rigid hub, a rigid rim, and at least one member of resiliently distortible material flexibly connecting said hub and rim.

2. A chain coupling comprising two coaxial sprockets and a single chain surrounding and engaging both said sprockets, wherein at least one of said sprockets is formed of a rigid hub, a rigid rim, and a ring of resiliently distortible material flexibly connecting said hub and rim.

3. A chain coupling comprising two coaxial sprockets and a single chain surrounding and engaging both said sprockets, wherein at least one of said sprockets is formed of a rigid hub, a rigid rim and at least one rubber member flexibly connecting said hub and said rim.

4. A chain coupling comprising two coaxial sprockets and a single chain surrounding and engaging both said sprockets, wherein at least one of said sprockets is formed of a rigid hub, a rigid rim and at least one flexible connecting member of rubber bonded to opposed surfaces on said hub and rim.

5. A chain coupling comprising two coaxial sprockets and a single chain surrounding and engaging both said sprockets, wherein at least one of said sprockets is formed of a rigid hub, a rigid rim, and a ring of rubber bonded to concentric cylindrical surfaces on said hub and said rim.

6. A chain coupling comprising two coaxial sprockets and a single chain surrounding and engaging said sprockets, wherein at least one of said sprockets is formed of a rigid rim engaging said chain, a rigid hub having a conical surface axially spaced from a plane surface of said rim, and a rubber ring disposed between and bonded to said conical surface of said hub and the plane surface of said rim.

7. A chain coupling comprising two coaxial sprockets and a single chain surrounding and engaging said sprockets, wherein said sprockets are formed of two rigid substantially disk-shaped chain engaging members axially spaced from each other, two coaxial hubs disposed on opposite sides of said disk-shaped members and axially spaced therefrom, and rubber rings disposed between and bonded to opposed surfaces of said hubs and said disk-shaped members.

ONISSIM BURAWOY.

REFERENCES CITED

The following references are of record in the file of this patent:

UNITED STATES PATENTS

| Number | Name | Date |
|---|---|---|
| 2,301,600 | Wilson | Nov. 10, 1942 |
| 2,451,683 | Mantle | Oct. 19, 1948 |